(12) United States Patent
Judd et al.

(10) Patent No.: US 8,554,204 B2
(45) Date of Patent: Oct. 8, 2013

(54) COMMUNICATION MANAGEMENT UNIT SERVER CAPABILITY

(75) Inventors: Tom D. Judd, Woodinville, WA (US);
Randy Durand, Redmond, WA (US);
Donald C. Kauffman, Laurel, MD (US)

(73) Assignee: Honeywell International Inc., Morristown, NJ (US)

( * ) Notice: Subject to any disclaimer, the term of this patent is extended or adjusted under 35 U.S.C. 154(b) by 727 days.

(21) Appl. No.: 12/235,731

(22) Filed: Sep. 23, 2008

(65) Prior Publication Data

US 2010/0075614 A1    Mar. 25, 2010

(51) Int. Cl.
*H04W 4/00* (2009.01)
*H04B 1/034* (2006.01)
*H04M 3/42* (2006.01)

(52) U.S. Cl.
USPC ............................ 455/431; 455/98; 455/414.1

(58) Field of Classification Search
USPC .......... 455/569.2, 566.2, 575.9, 431, 98, 427, 455/432.2, 410, 411.1, 73, 556.2, 66.1, 99; 340/506, 825.72, 945; 701/2, 3, 120
See application file for complete search history.

(56) References Cited

U.S. PATENT DOCUMENTS

| | | | |
|---|---|---|---|
| 7,142,854 | B1 | 11/2006 | Kauffman et al. |
| 7,177,939 | B2 * | 2/2007 | Nelson et al. ................. 709/230 |
| 7,908,042 | B2 * | 3/2011 | Brinkley et al. .................. 701/3 |
| 2003/0003872 | A1 | 1/2003 | Brinkley et al. |
| 2003/0093798 | A1 | 5/2003 | Rogerson |
| 2007/0027589 | A1 | 2/2007 | Brinkley et al. |
| 2007/0032921 | A1 | 2/2007 | Allen |
| 2007/0032941 | A1 | 2/2007 | Allen |

FOREIGN PATENT DOCUMENTS

| | | |
|---|---|---|
| GB | 2433005 | 6/2007 |
| WO | 0160693 | 8/2001 |
| WO | 02103931 | 12/2002 |

OTHER PUBLICATIONS

Griep et al., "Flight Trial Architectures Supporting Migration to Broadband Internet Protocol (IP) for Airline Operation Communications", "Boeing Technology", May 3, 2006, Publisher: Phantom Works, Published in: Boeing, PA.
European Patent Office, "European Search Report", mailed Feb. 9, 2012, Published in: EP.
European Patent Office, "Office Action", "from Foreign Counterpart of U.S. Appl. No. 12/235,731", Oct. 18, 2012, pp. 1-4, Published in: EP.
European Patent Office, "Summons to Attent Oral Proceedings", "from Foreign Counterpart of U.S. Appl. No. 12/235,731", Jun. 17, 2013, pp. 1-6, Published in: EP.
"ARINC Protocol Tutorial", Jun. 7, 2000, pp. 1-29, Publisher: Condor Engineering.

* cited by examiner

*Primary Examiner* — Eugene Yun
(74) *Attorney, Agent, or Firm* — Fogg & Powers LLC

(57) ABSTRACT

An avionic communication unit with interface capabilities is provided. The communication unit includes at least one first type port, at least one second type port and a communication function. The at least one first type port is configured to couple a communication link using a first communication format to the communication unit. The at least one second type port is configured to couple a communication link using a second communication format to the communication unit. The communication function is configured to provide communications to and from an aircraft. The communication function is further configured to interface communications between the at least one first type port and the at least one second type port wherein avionic devices located on the aircraft and using different communication formats coupled to the respective ports can communicate.

18 Claims, 2 Drawing Sheets

COMMUNICATION MANAGEMENT UNIT SERVER CAPABILITY

BACKGROUND

Avionics communication units are used to provide communications between avionic devices and the ground or other aircraft. An example of a communication unit is a communication management unit (CMU). A CMU uses an aircraft communication addressing and reporting system (ACARS). ACARS is a character oriented protocol that goes between air and ground. With ACARS, traditional aircraft transmission mediums such as very high frequency (VHF), SATCOM, and high frequency (HF) are used. Another example of a device that has been recently developed to provide communications between the aircraft and ground is a gatelink unit. A gatelink unit uses Wi-Fi, Cell or other wireless technology communication between the aircraft and ground. These are two examples of communication units that provide among other functions, a communication means to and from the aircraft for other flight deck type avionic devices. Avionic devices are typically linked to a communication unit using aircraft specific formats such as ARINC 429. ARINC 429 is a data bus and a communications format. There is a desire to use off the shelf components for avionic devices. However, adding avionics specific format links to off the shelf components is very expensive.

For the reasons stated above and for other reasons stated below which will become apparent to those skilled in the art upon reading and understanding the present specification, there is a need in the art for a method and system of providing communications between avionic devices in an effective, cost efficient manner.

SUMMARY OF THE INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, an avionic communication unit is provided. The communication unit includes at least one first type port, at least one second type port and a communication function. The at least one first type port is configured to couple a communication link using a first communication format to the communication unit. The at least one second type port is configured to couple a communication link using a second communication format to the communication unit. The communication function is configured to provide communications to and from an aircraft. The communication function is further configured to interface communications between the at least one first type port and the at least one second type port wherein avionic devices located on the aircraft and using different communication formats coupled to the respective ports can communicate.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a system and method for linking avionics devices with each other even though the devices may communicate with different communication formats. As used herein, an avionics device is defined as a device located on an aircraft, artificial satellite or spacecraft. In particular, in embodiments a communication unit, such as a communication management unit or a gatelink unit, provide an interface between other avionic devices to provide communication links. Hence, avionic devices that are not equipped to communicate in an avionic specific communication format, such as ARINC 429, can communicate with other avionic devices that are equipped to communicate in an avionic specific communication format.

Figure 1:
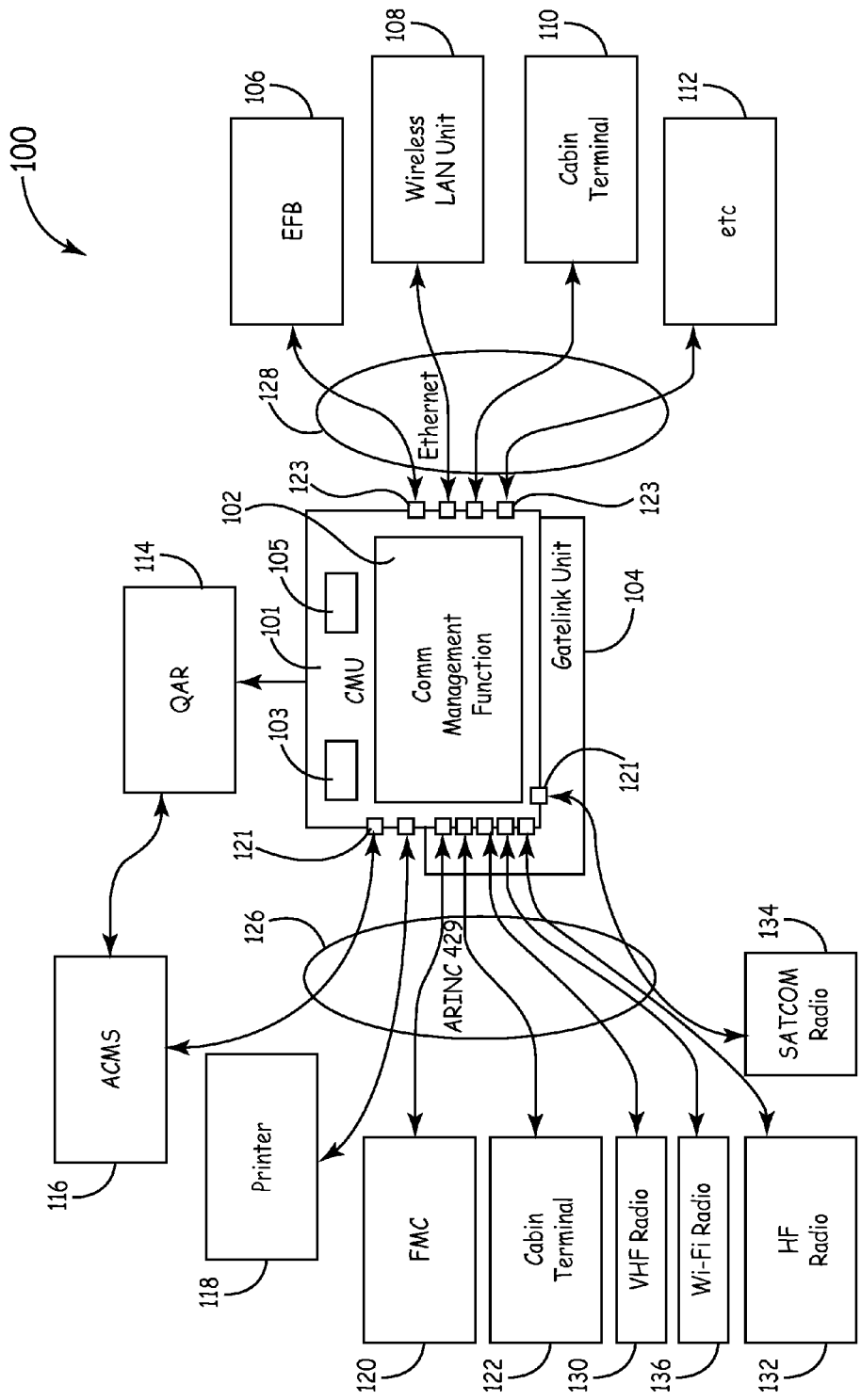
FIG. 1 is a block diagram of a avionic system of one embodiment of the present invention.

Referring to FIG. 1 an avionics communication system 100 of one embodiment is illustrated. System 100 includes communication unit 101 such as a CMU 101. In an alternative embodiment the communication unit is a gatelink unit 104. It yet another embodiment more than one communication unit is provided such as a communication management unit 101 (CMU) and a gatelink unit 104. As discussed above one of the functions of the CMU 101 and 104 is to provide a communication links between devices of the aircraft and the ground or another aircraft. In the example of FIG. 1, avionic devices that use an aircraft specific format communication link 126 (ARINC 429) include, but are not limited to, an aircraft condition monitoring system (ACMS) 116, a printer 118, a flight management computer 120, and cabin terminal 122, as well as air/ground communications avionics including very high frequency (VHF) radios 130, high frequency (HF) radios 132, SATCOM radios 134, and Wi-Fi radios 136. The ACMS 116 gathers flight information during flight. Also illustrated is a quick access recorder (QAR) 114 that is in communication with the ACMS 116 and the communication unit 101. FIG. 1, further illustrates devices in communication with the communication unit 101 with non-avionic specific formation communication links. In this example, an Ethernet format link 128 is illustrated, however, any type of format communication link can be used that is different than communication unit's traditional avionics link 126. The devices using the non-avionic communication link includes an electronic flight bag (EFB) 106, a wireless lan unit 108, another cabin terminal 110 as well as any other type of avionic device as indicated by 112. As illustrated, the avionic devices that communicate with the ARINC 429 are coupled to the CMU 101 via ports 121 that are configured for the ARINC 429 format. Likewise, the avionic devices using the Ethernet communication format are coupled to the CMU 101 via ports 123 that are configured for the Ethernet communication format.

As discussed above, embodiments of the present invention allow for communication links between avionic devices to share information via the communication unit such as CMU 101 and gatelink unit 104. For example, an EFB 106 is typically uploaded with information such as flight manuals and are hooked up to the flight deck when the aircraft is preparing for takeoff. If the EFB 106 is off the shelf it can be pretty expensive to add an aircraft specific communication format link such as ARINC 429 to hook it up to other avionic devices that use the ARINC 429 format. For example, a print out from the EFB 106 may be desired, however since printer 118 communicates with the ARINC 429 format this would previously not be possible unless the EFB was adapted to communication in the ARINC 429 format or another printer is used. The use of another printer is not desired due to the cost and the space, in addition to the extra wiring, weight, etc., that the printer would need. In embodiments, a communication unit such as the CMU 101 or gatelink unit 104 provides an interface between the EFB 106 and printer 118 thereby eliminating the need for an avionic specific communication format link for the EFB or an extra printer. Moreover, embodiments allow the EFB to get data from the FMC, ACMS and QAR for example without have the avionic specific communication format link ability.

Figure 2:
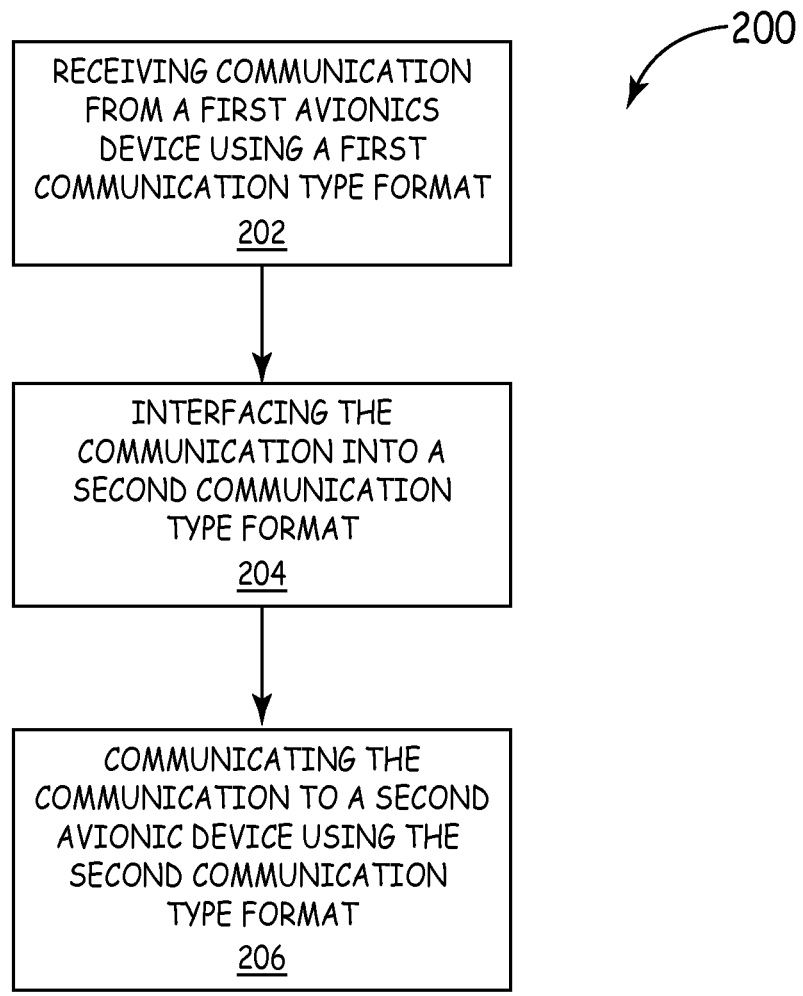
FIG. 2 is an interface flow diagram illustrating the operation of a communication unit of one embodiment of the present invention.

Hence, embodiments of the present invention allow for the sharing of information between avionic devices even though the avionic devices do not have compatible communication format links. FIG. 2 illustrates an interface flow diagram 200 of one method of interfacing communications with a communication unit such as a CMU 101 and a gatelink unit 104. Using the CMU 101 example, a communication management function (CMF) 102 provides the interface. As illustrated in FIG. 2, the process starts by receiving a communication from a first avionic device using a first communication format type (202). In embodiments, the communication includes information regarding the address of the avionic device it is to be sent to. The CMF 102 then interfaces the communication into a second communication format type (204). The CMU 101 then communicates the communication to a second avionic device the communication was addressed to using the second communication format (206).

As discussed above, the CMF 102 provides the interface in one embodiment. The CMF 102 in one embodiment is software. Referring back to FIG. 1, it is illustrated, that the CMU 101 also includes a processor 103 and a memory 105 that stores instructions. Processor 103 includes or functions with software programs, firmware or computer readable instructions such as the CMF 102 for carrying out various methods, process tasks, calculations, and control functions, used in interfacing between communication formats. These instructions are typically tangibly embodied on any appropriate medium used for storage of computer readable instructions or data structures. Such computer readable media can be any available media that can be accessed by a general purpose or special purpose computer or processor, or any programmable logic device. Suitable computer readable media may include storage or memory media such as magnetic or optical media, e.g., disk or CD-ROM, volatile or non-volatile media such as RAM (e.g. SDRAM, DDR SDRAM, RDRAM, SRAM, etc.), ROM, EEPROM, flash memory, etc. as well as transmission media such as electrical, electromagnetic, or digital signals, conveyed via a communication medium such as a network and/or a wireless link. In this embodiment, the instructions are stored on storage medium 105. It will be understood that the gatelink unit 104 has similar memory and communication function components.

Although specific embodiments have been illustrated and described herein, it will be appreciated by those of ordinary skill in the art that any arrangement, which is calculated to achieve the same purpose, may be substituted for the specific embodiment shown. For example, although the embodiments above discuss ARINC 429 and Ethernet, it is to be understood that other interfaces and avionics busses can be used in other embodiments. For example, other interfaces include, but are not limited to, RS232, RS422, and IEEE Serial Bus. Similarly, another avionics bus includes, but is not limited to, ARINC 629. This application is intended to cover any adaptations or variations of the present invention. Therefore, it is manifestly intended that this invention be limited only by the claims and the equivalents thereof.

The invention claimed is:

1. An avionic communication unit, the communication unit comprising:
   at least one first type port configured to couple a wired ARINC 429 communication link using a first communication format to the communication unit;
   at least one second type port configured to couple a wired Ethernet communication link using a second communication format to the communication unit; and
   a communication function configured to interface communications between devices in at least one of the following manners:
      from a flight management computer (FMC), an Aircraft Condition Monitoring system (ACMS), a Cabin Terminal, or a printer, each having a wired ARINC 429 connection to the at least one first type port, to an avionics device located on an aircraft having a wired Ethernet connection to the at least one second type port; and
      from the avionics device located on the aircraft to a flight management computer (FMC), an Aircraft Condition Monitoring system (ACMS), a Cabin Terminal, or a printer, each having a wired ARINC 429 connection to the at least one first type port;
   wherein the communication function is also configured to provide communications to and from the aircraft;
   wherein avionic devices located on the aircraft and using different communication formats coupled to the respective ports can communicate.

2. The device of claim 1, further comprising:
   a processor configured to process the communication function; and
   a memory to store the communication function.

3. The device of claim 1, wherein the communication function is a communication management function (CMF) of a communication management unit (CMU).

4. The device of claim 1, wherein the communication unit is a gatelink unit.

5. The device of claim 1, wherein the at least one first type port is an ARINC 429 port and the at least one second type port is an Ethernet port.

6. An aircraft communication system, the system comprising:
   a communication unit configured to provide communications to and from the aircraft;
   at least one first avionic device located on the aircraft comprising a flight management computer (FMC), an Aircraft Condition Monitoring system (ACMS), a Cabin Terminal, or a printer and in communication with the communication unit via a wired ARINC 429 connection using a first communication format;

at least one second avionic device located on the aircraft and in communication with the communication unit via a wired Ethernet connection using a second communication format; and wherein the communication unit is configured to interface communications between devices in at least one of the following manners:

from the at least one first avionic device to the at least one second avionic device; and from the at least one second avionic device to the at least one first avionic device.

7. The system of claim 6, wherein the communication unit is a communication management function.

8. The system of claim 6, wherein the communication unit is a gatelink unit.

9. The system of claim 6, wherein the first communication format is an avionic specific communication format.

10. The system of claim 6, wherein the first communication format is ARINC 429 and the second communication format is Ethernet.

11. The system of claim 6, wherein the at least one second avionic device is one of an aircraft electronic flight bag (EFB), a wireless LAN unit and a cabin terminal.

12. A method of operating a communication unit in an aircraft, the method comprising:

performing communication functions to and from the aircraft; and interfacing communications between devices in at least one of the following manners:

from a first avionic device comprising a flight management computer (FMC), an Aircraft Condition Monitoring system (ACMS), a Cabin Terminal, or a printer, the first avionic device located on the aircraft and coupled to the communication unit via a wired ARINC 429 connection using a first communication format, to a second avionic device located on the aircraft and coupled to the communication unit via a wired Ethernet connection using a second communication format; and from the second avionic device to the first avionic device.

13. The method of claim 12, wherein interfacing communications between a first avionic device using a first communication format and a second avionic device using a second communication format further comprises:

receiving a communication from the first avionic device directed to the second avionic device;

converting the communication from the first communication format to the second communication format; and passing the communication on to the second avionic device using the second communication format.

14. The method of claim 12, wherein performing communication functions to and from the aircraft further comprising:

communicating to and from the aircraft with at least one of very high frequency (VHF) radio, high frequency (HF) radio, SATCOM radio and Wi-Fi radio.

15. The method of claim 12, further comprising:

using ARINC 429 as the first communication format.

16. The method of claim 12, further comprising:

using Ethernet as the second communication format.

17. The method of claim 12, wherein interfacing communications between a first avionic device using a first communication format and a second avionic device using a second communication format further comprises:

retrieving instructions from a memory regarding the conversion between the first and second communication formats; and processing the instruction to convert the communication.

18. The method of claim 17, further comprising:

receiving a communication from the first avionic device using the first communication format at a first port configured to communicate in the first communication format; and passing the communication on to the second avionic device using the second communication format via second port configured to communicate in the second communication format.

* * * * *